United States Patent [19]

Rayson et al.

[11] Patent Number: 5,012,065

[45] Date of Patent: Apr. 30, 1991

[54] INDUCTIVELY COUPLED PLASMA TORCH WITH LAMINAR FLOW COOLING

[75] Inventors: Gary D. Rayson; Yang Shen, both of Las Cruces, N. Mex.

[73] Assignee: New Mexico State University Technology Transfer Corporation, Las Cruces, N. Mex.

[21] Appl. No.: 440,233

[22] Filed: Nov. 20, 1989

[51] Int. Cl.[5] .................... B23K 9/00

[52] U.S. Cl. .................... 219/121.52; 219/121.51; 219/121.49; 219/121.48; 315/111.51

[58] Field of Search .................... 219/121.52, 121.49, 219/121.5, 121.59, 121.36, 121.48; 315/111.51, 111.21

[56] References Cited

U.S. PATENT DOCUMENTS

| | | | |
|---|---|---|---|
| 4,035,604 | 7/1977 | Meleka et al. | 219/121.52 |
| 4,266,113 | 5/1981 | Denton et al. | 219/121.49 |
| 4,482,246 | 11/1984 | Meyer et al. | 219/121.51 |
| 4,716,269 | 12/1987 | Carkhuff | 219/121.51 |
| 4,833,294 | 5/1989 | Montaser et al. | 219/121.52 |

OTHER PUBLICATIONS

"Design and Construction of a Low-Flow, Low--Power Torch for Inductively Coupled Plasma Spectrometry" by R. Rezaaiyaan, et al, *Applied Spectroscopy*, vol. 36, p. 627 (1982).

"Development and Characterization of a Miniature Inductively Coupled Plasma Source for Atomic Emission Spectrometry" by R. N. Savage, et al., *Anal. Chem.*, vol. 51, p. 408 (1979).

"Development and Characterization of a 9-mm Inductively-Coupled Argon Plasma Source for Atomic Emission Spectrometry" by A. D. Weiss, et al, *Anal. Chem.*, vol. 124, p. 245 (1981).

"Reduction of Argon Consumption by a Water Cooled Torch in Inductively Coupled Plasma Emission Spectrometry" by G. R. Kornblum, et al, *Anal. Chem.*, vol. 51, p. 2378 (1979).

"Water-Cooled Torch for Inductively Coupled Plasma Emission Spectrometry" by H. Kawaguchi, et al., *Anal. Chem.*, vol. 52, p. 2440 (1980).

"A New Reduced-Pressure ICP Torch" by C. J. Seliskar et al, *Applied Spectroscopy*, vol. 39, p. 181 (1985).

"Determination of Metals in Zylene by Inductively Coupled Air Plasma Emisson Spectrometry" by G. A. Meyer, *Spectrochim. Acta*, Part B, vol. 42B, p. 201 (1987).

"A Radiatively Cooled Torch for ICP-AES Using 1 $lmin^{-1}$ of Argon" By P. S. C. Van Der Plas et al, *Spectrochim. Acta*, vol. 39B, p. 1161 (1984).

"Analytical Characteristics of a Low-Flow, Low--Power Inductively Coupled Plasma" by R. Rezaaiyaan et al., *Anal. Chem.*, vol. 57, p. 412 (1985).

"Interferences in a Low-Flow, Low-Power Inductively Coupled Plasma" by R. Rezaaiyaan, et al., *Spectrochim. Acta*, Part B, vol. 40B, p. 73 (1985).

"Noise-Power Spectra of Optical and Acoustic Emission Signals from an Inductively Coupled Plasma" by R. M. Belchamber et al., *Spectrochim. Acta*, Part B, vol. 37B, p. 17 (1982).

(List continued on next page.)

*Primary Examiner*—M. H. Paschall
*Attorney, Agent, or Firm*—Deborah A. Peacock; William A. Eklund

[57] ABSTRACT

An improved inductively coupled gas plasma torch. The torch includes inner and outer quartz sleeves and tubular insert snugly fitted between the sleeves. The insert includes outwardly opening longitudinal channels. Gas flowing through the channels of the insert emerges in a laminar flow along the inside surface of the outer sleeve, in the zone of plasma heating. The laminar flow cools the outer sleeve and enables the torch to operate at lower electrical power and gas consumption levels additionally, the laminar flow reduces noise levels in spectroscopic measurements of the gaseous plasma.

16 Claims, 12 Drawing Sheets

OTHER PUBLICATIONS

"Low-Noise Laminar Flow Torch for Inductively Coupled Plasma Atomic-Emission Spectrometry" by J. Davies, et al., *Analyst,* vol. 110, p. 887 (1985).
"Off-Axis Imaging for Improved Resolution and Spectral Intensities" by S. G. Salmon, et al,. *Anal. Chem.,* vol. 50, p. 1714 (1978).
"Short-Time Electrode Processes and Spectra in a High-Voltage Spark Discharge" by J. P. Walters, *Anal. Chemn,* vol. 40, p. 1540 (1968).
"A Spectrometer for Time-Gated, Spatially-Resolved Study of Repetitive Electrical Discharges" by R. J. Klueppel, et al. *Spectrochim. Acta,* Part B, vol. 33, p. 1 (1978).
"Nomenclature System for the Low-Power Argon Inductively Coupled Plasma" by S. R. Koirtyohann, et al., *Anal. Chem.,* vol. 52, p. 1965 (1980).
"Laminar-Flow Torch of Helium Inductively Coupled Plasma Spectrometry" by H. Tan, et al, *Anal Chem,* vol. 60 pp. 2542-2544 (1988).
"Studies of a Low-Noise Laminar Flow Torch for Inductively Coupled Plasma Atomic Emission Spectrometry, Part 2, Noise Power Studies and Interference Effects" by Davies, et al *Journal of Analytical Atomic Spec* (vol. 2, pp. 27-31, (1987).
"Studies of a Low-Noise Laminar Flow Torch for Inductively Coupled Plasma Atomic Emission Spectrometery" by J. Davies, et al., *Journal of Analytical Atomic Spectrometry,* vol. 1 (1986).

INDUCTIVELY COUPLED PLASMA TORCH WITH LAMINAR FLOW COOLING

GOVERNMENT RIGHTS

The U.S. Government has a paid-up license in this invention and the right in limited circumstances to require the patent owner to license others on reasonable terms.

BACKGROUND OF THE INVENTION

1. Field of the Invention (Technical Field)

A new low-flow, low-power torch has been developed which utilizes laminar coolant gas flows. The laminar flow torch (LFT) is constructed by the addition of a machined insert between the outer and intermediate tubing of a conventional turbulent flow torch (TFT). This configuration has been demonstrated to provide both greater intensity signal and improved signal to noise ratio in comparison to a TFT at relatively low-power and low-flow operation conditions. The LFT demonstrated an increase in the intensity of the detected response of as much as a factor of ten for calcium ion. This LFT design has displayed excellent potential for use as a low-power, low-flow inductively coupled plasma torch for atomic emission spectroscopy.

2. Description of the Related Art Including Information Disclosed under 37 C.F.R. §§1.97-1.99 (Background Art)

Many efforts have been made to improve the analytical performance of inductively coupled plasma (ICP) torches with lower argon gas consumption rates and lower applied radio frequency (rf) power requirements. These efforts have included reducing the overall dimensions of the torches (See "Design and Construction of a Low-Flow, Low-Power Torch for Inductively Coupled Plasma Spectrometry", R. Rezaaiyaan, et al., *Allied Spectroscopy,* Vol. 36, p. 627 (1982)), modification of current torch dimensions (see Rezaaiyaan, et al., ibid.; "Development and Characterization of a Miniature Inductively Coupled Plasma Source for Atomic Emission Spectrometry", R. N. Savage, et al., *Anal. Chem.*, Vol. 51, p. 408 (1979); and "Development and Characterization of a 9-mm Inductively-Coupled Argon Plasma Source For Atomic Emission Spectrometry", A. D. Weiss, et al., *Anal. Chem.*, Vol. 124, p. 245 (1981)), enhanced cooling efficiency of the torch (see "Reduction of Argon Consumption by a Water Cooled Torch in Inductively Coupled Plasma Emission Spectrometry", G. R. Kornblum, et al., *Anal. Chem.*, Vol. 51, p. 2378, (1979); and "Water-Cooled Torch for Inductively Coupled Plasma Emission Spectrometry", H. Kawaguchi, et al., *Anal. Chem.*, Vol. 52, p. 2440 (1980)), and the use alternate coolant media (e.g., air, water, or radiative cooling). (See "A New Reduced-Pressure "ICP Torch", C. J. Seliskar, et al., *Applied Spectroscopy,* Vol. 39, p. 181 (1985); "Determination of Metals in Xylene by Inductively Coupled Air Plasma Emission Spectrometry", G. A. Meyer, *Spectrochim. Acta,* Part B, Vol. 42B, p. 201 (1987); and "A Radiatively Cooled Torch for ICP-AES Using 1 1 $min^{-1}$ of Argon", P. S. C. van der Plas, et al., *Spectrochim. Acta,* Vol. 39B, p. 1161 (1984)).

Typically, ICP torches have incorporated tangential flows for stabilization of the discharge. Optimization studies have indicated the constriction of the inner diameter of the gas inlet tubes of the torch to be a desirable feature in the construction of a low-power, low-flow torch (see Rezaaiyaan, loc. cit.; "Analytical Characteristics of a Low-Flow, Low-Power Inductively Coupled Plasma", R. Rezaaiyaan, et al., *Anal. Chem.* Vol. 57, p. 412 (1985)); and "Interferences in a Low-Flow, Low-Power Inductively Coupled Plasma", R. Rezaaiyaan, et al., *Spectrochim. Acta*, Part B, Vol. 40B, p. 73, (1985)). Constriction of the inlet tubing was proposed to result in a higher gas velocity of the gas vortex used to stabilize the plasma within the torch. However, this vortex gas flow pattern has been proposed to be the source of a 200-300 Hz component of the noise-power spectrum of the emission from an ICP (see R. M. Belchamber, et al., *Spectrochim. Acta*, Part B, Vol. 37B, p. 17, (1982)). Davies and Snook (*J. Anal. Atom. Spectrosc.*, Vol. 1, p 195 (1986). and Analyst, Vol. 110, p. 887 (1985)) have recently described a torch design which demonstrated increased linear dynamic range and a reduction in the measured noise by incorporating laminar flow introduction of the coolant gas at the base of the torch.

An alternative design of a laminar flow torch (LFT) has been developed in accordance with the invention. The design incorporates several features which have been determined to improve the analytical performance of the torch with reductions in the rate of argon gas consumption and the required rf power level. It is based on the principle that a thin, ordered coolant gas flow along the inner wall of the plasma torch will be sufficient to keep the plasma fire ball away from the torch wall and to remove the heat generated in the plasma discharge. By arranging the coolant in a highly ordered thin layer, the operation of a low-power, low-flow, low-noise plasma torch has been achieved.

SUMMARY OF THE INVENTION (Disclosure of the Invention)

The present invention relates to an inductively coupled gas plasma torch. This plasma torch comprises an outer tubular sleeve and an inner tubular sleeve. The inner tubular sleeve is positioned concentrically within and spaced inwardly from the outer tubular sleeve. The torch further comprises a tubular insert having inner and outer surfaces. The tubular insert is positioned concentrically between the outer tubular sleeve and the inner tubular sleeve. The tubular insert further includes a plurality of gas flow channels extending longitudinally along the outer surface of the insert and opening radially outwardly from the outer surface of the insert. The diameter and wall thickness of the insert are sized such that the insert fits snugly between the outer and inner tubular sleeves, whereby gas introduced into the torch between the inner and outer tubular sleeves is constrained to flow through the channels of the insert and emerges therefrom in a laminar flow along the inner surface of the outer sleeve to cool the outer sleeve.

In the preferred embodiment, the outer sleeve and the inner sleeve each include a discharge end. The discharge end of the inner sleeve is spaced longitudinally inwardly from the discharge end of the outer sleeve, to provide a heating zone between the discharge end of the outer sleeve and the discharge end of the inner sleeve wherein gas emerging from the discharge end of the inner sleeve can be inductively heated by means of an induction coil encircling the outer sleeve in the vicinity of the heating zone.

The insert includes a discharge end and an inlet end. The discharge end of the insert is spaced longitudinally inwardly from the discharge end of the inner sleeve, whereby radiative heating of the insert by plasma formed in the heating zone is minimized. The insert preferably includes approximately 30 equally spaced longitudinal channels. These channels are preferably rectangular in cross section, are equidimensional, and have a width no greater than the depth of the channels (preferably approximately 0.2 millimeters deep).

The inner sleeve is preferably stepped up in diameter over a length extending from the discharge end of the inner sleeve. The length over which the inner sleeve is stepped up in diameter is preferably less than the length of the tubular insert.

The insert is preferably formed of a high temperature machinable polymer, or a refractory material, such as boron nitride.

The inductively coupled gas plasma torch preferably further comprises a sample injection tube positioned centrally and concentrically within the inner sleeve and having a substantially smaller diameter than the inner sleeve, whereby a sample may be centrally introduced into a gas stream flowing through the inner sleeve. The sample injection tube may terminate at a discharge end spaced longitudinally inwardly from the discharge end of the inner sleeve, whereby a sample of gas or aerosol may be centrally introduced into a gas stream flowing through the inner sleeve and thereby introduced into the heating zone of the torch.

The tubular insert preferably has a length greater than its diameter. The inner and outer tubular sleeves are preferably formed of quartz.

Accordingly, it is an object and purpose of the present invention to provide an improved inductively coupled gas plasma torch.

It is also an object and purpose of the present invention to provide an inductively coupled gas plasma torch that is continuously operable with a lower flow of gas than has previously been attainable, and which is more efficiently cooled.

It is also an object and purpose of the present invention to provide an inductively coupled gas plasma torch which is continuously operable at a lower electrical power consumption level than has previously been attainable.

It is also an object and purpose of the present invention to provide an inductively coupled gas plasma torch wherein improved cooling and spectroscopic performance are obtained through the elimination of turbulent gas flow along the plasma containment tube.

The foregoing objects and purposes are attained in the inductively coupled gas plasma torch of the present invention, which generally comprises an outer tubular sleeve and an inner tubular sleeve, with the inner tubular sleeve being positioned concentrically within and spaced inwardly from the outer tubular sleeve. The torch further comprises a tubular insert having inner and outer surfaces, which is positioned concentrically between the outer tubular sleeve and the inner tubular sleeve. The insert includes a plurality of gas flow channels extending longitudinally along the outer surface of said insert and opening radially outwardly therefrom. The diameter and wall thickness of the insert are sized such that the insert fits snugly between the outer and inner tubular sleeves, whereby gas introduced into the torch between the inner and outer tubular sleeves is constrained to flow through the channels of the insert and emerges therefrom in a laminar flow along the inner surface of the outer sleeve to thereby cool the outer sleeve. The laminar flow of a thin layer of coolant gas along the outer sleeve is found to more efficiently cool the outer sleeve along the heating zone where plasma is generated, and also results in improved spectroscopic performance with respect to gaseous species in the plasma.

In the inductively coupled gas plasma torch of the present invention the inner sleeve preferably terminates at a distance inside the discharge end of the outer sleeve, so that there is provided a heating zone between the discharge end of the outer sleeve and the discharge end of the inner sleeve, in which zone a gas emerging from the discharge end of the inner sleeve is inductively heated by means of an induction coil which encircles the outer sleeve in the vicinity of the heating zone. The insert preferably includes a discharge end which is spaced longitudinally inwardly from the discharge end of the inner sleeve, whereby radiative heating of the insert by plasma formed in the heating zone is minimized.

In the preferred embodiment of the invention, the insert preferably includes approximately 30 equally spaced longitudinal channels, which are preferably rectangular in cross section. The channels are preferably equidimensional; that is, they are all of the same dimension; and preferably have a width no greater than their depth. In the preferred embodiment, in which the insert is approximately 18 millimeters in diameter, the channels are approximately 0.2 millimeters deep.

In the preferred embodiment the inner sleeve is stepped up in diameter over a length extending from the discharge end of the inner sleeve, and the length over which the inner sleeve is stepped up in diameter is less than the length of the tubular insert.

The insert is preferably formed of a high temperature machinable polymer, such as the polymer sold commercially under the name DELRIN. Alternatively, the insert may be formed of a refractory material, such as boron nitride.

The torch will ordinarily further include a sample injection tube positioned centrally and concentrically within the inner sleeve, and which is of a substantially smaller diameter than the inner sleeve. A sample to be analyzed spectroscopically may be centrally introduced into a gas stream flowing through the inner sleeve.

These and other aspects of the invention will be more apparent upon consideration of the accompanying drawings and the following detailed description of the invention.

BRIEF DESCRIPTION OF THE DRAWINGS

The accompanying drawings, which are incorporated into and form a part of the specification, illustrate several embodiments of the present invention and, together with the description, serve to explain the principles of the invention.

DETAILED DESCRIPTION OF THE PREFERRED EMBODIMENT OF THE INVENTION (Best Mode for Carrying Out the Invention)

Torch Design and Structure

Figure 1:
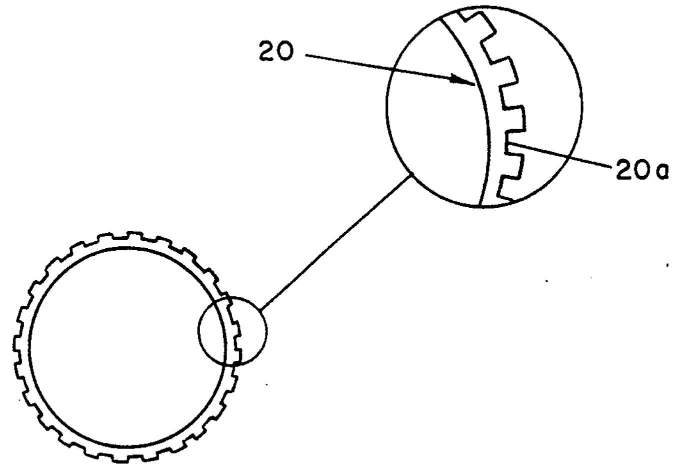
FIG. 1 is a cross sectional view of the insert of the torch of the present invention, with a magnified partial view.
Figure 2:
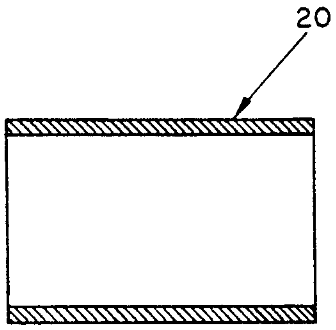
FIG. 2 is a side view of the insert of FIG. 1.
Figure 3:
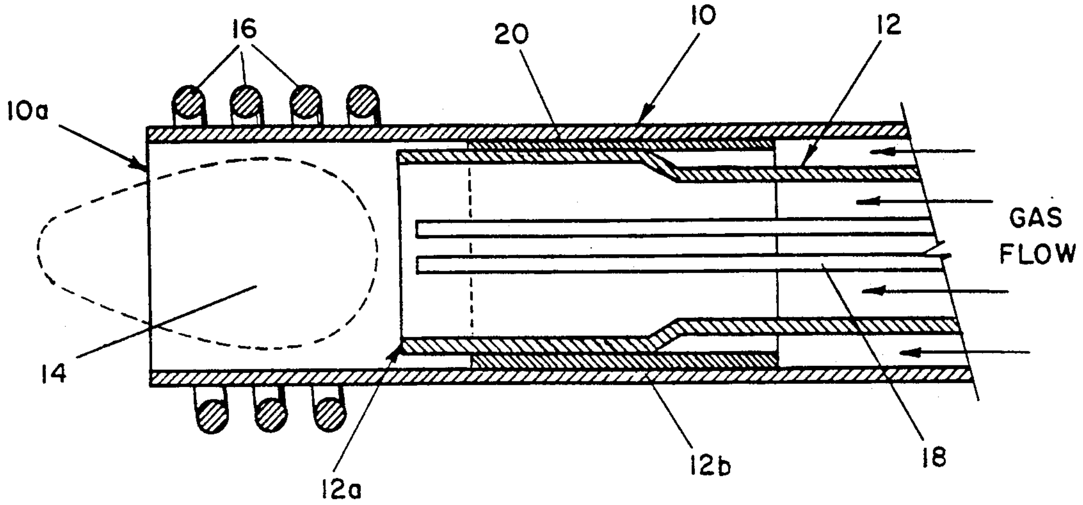
FIG. 3 is a side view of the inductively coupled gas plasma torch of the present invention.

As is shown in FIGS. 1 through 3, the preferred embodiment of the inductively coupled gas plasma torch of the present invention includes an outer tubular quartz sleeve 10, which includes a discharge end 10*a*. Positioned inside the sleeve 10 is an inner quartz sleeve 12. The inner sleeve 12 includes a discharge end 12*a* which is spaced longitudinally inwardly from the discharge end 10*a* of the outer tube 10. Between the discharge ends 10*a* and 12*a* of the inner and outer sleeves 10 and 12 is a plasma heating zone 14, in which gas flowing through the tubes 10 and 12 is inductively heated by means of radio frequency induction coil 16 which encircles the end of the outer sleeve 10.

The plasma is useful, for example, for spectroscopic studies of samples heated in the plasma. Samples in gaseous or aerosol form may be centrally introduced into the gas flow entering the plasma heating zone by means of a small-diameter sample injection tube 18, which is centrally positioned inside the inner sleeve 12, and which terminates in an open end just inside the end of the inner sleeve 12.

The torch further includes a tubular insert 20 which is concentrically positioned between the inner and outer quartz sleeves 10 and 12. The wall thickness and diameter of the insert 20 are sized so that the insert 20 fits snugly between the inner and outer sleeves 10 and 12.

The insert 20 includes a number of longitudinal channels 20*a* formed in the outer surface of the insert 20. The channels 20*a* open radially outwardly from the outer surface of the insert 20, and when fitted against the inside surface of the outer sleeve operate to form gas flow channels. In the illustrated embodiment the insert 20 is approximately 18 mm in inside diameter and is approximately 25 mm long. There are thirty channels 20*a*, each of which is approximately 0.2 mm deep.

The insert 20 is preferably formed of a high temperature machinable polymer, such as the polymer sold commercially under the tradename or trademark DELRIN. The use of a machinable polymer enables a snug, gas-tight fit to be obtained between the insert 20, the outer sleeve 10 and the inner sleeve 12.

The insert 20 is positioned so that its end closest to the plasma heating zone 14 is spaced inwardly from the end 12*a* of the inner sleeve 12. This positioning of the insert 20 serves to partially shield the polymeric insert 20 from radiative heating and possible damage caused by the high temperature gaseous plasma in the heating zone 14.

The inner sleeve 12 is stepped up in diameter over a portion 12*b* of its length. It is over this stepped up portion 12*b* that the insert is snugly fitted between the inner and outer sleeves 10 and 12. Upstream from the insert 20 the inner sleeve 12 is of smaller diameter, so as to facilitate introduction of the flow of the plasma gas through the annular space between the inner and outer sleeves 10 and 12.

Gas, such as argon, is passed through the gas flow channels 20*a* of the insert 20 and emerges to flow laminarly along the inside surface of the outer sleeve 10. It is found that this laminar flow, as opposed to the turbulent flow that results in the absence of the insert 20, results in lower power consumption, lower gas consumption, and further results in improved spectroscopic capabilities, as further discussed below.

In the following discussion, the present invention is referred to as a laminar flow torch (LFT), and is compared with turbulent flow torches (TFT).

Reynold's Number Calculations

Figure 4:
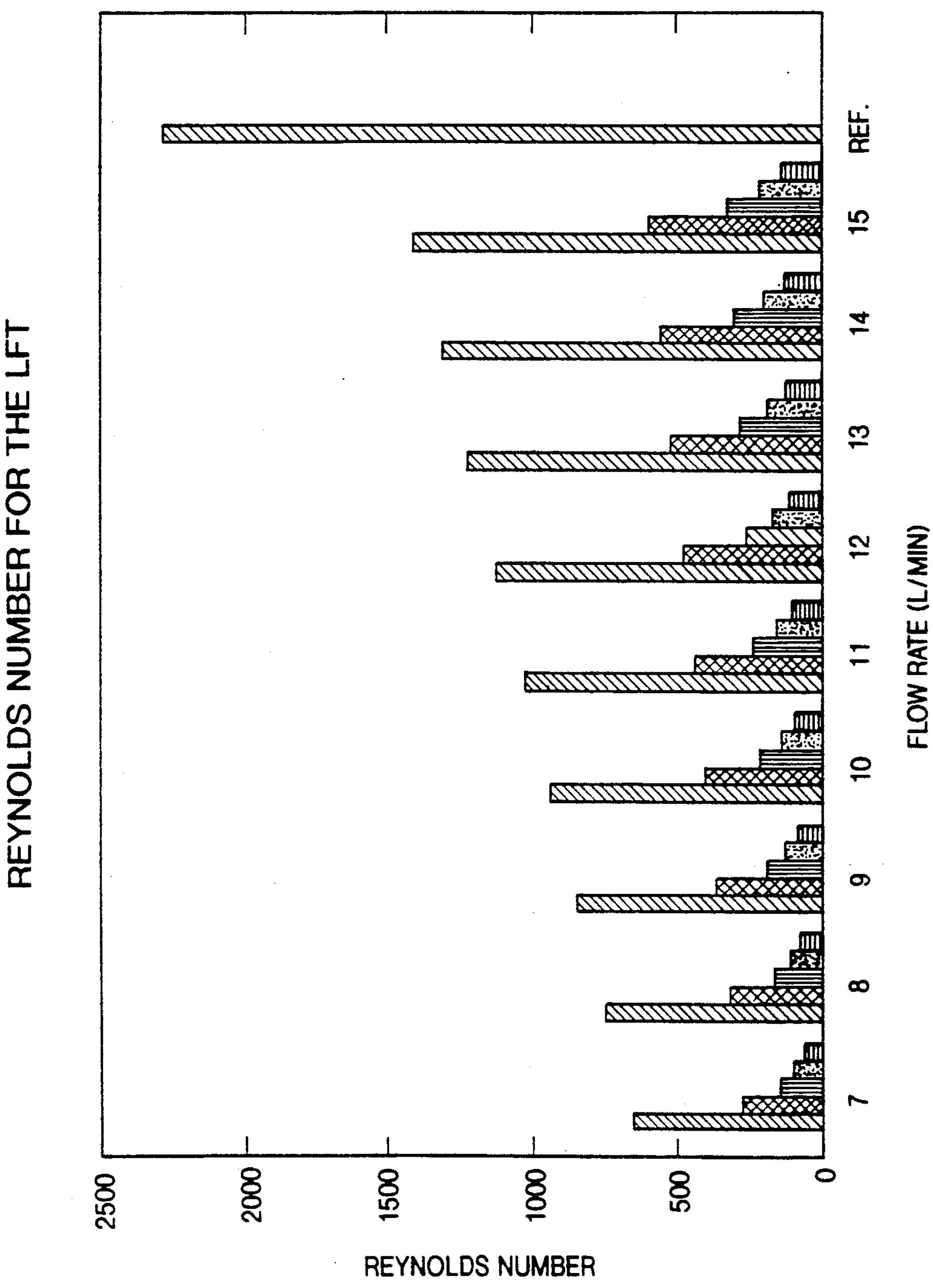
FIG. 4 is a graph of the Reynold's number for the LFT annulus between the plasma fire ball and the outer tubing wall.

The Reynold's number for the cooling gas flow region between the outer wall of the intermediate tubing and the inner wall of outer tubing is given by Davies and Snook (loc. cit.), $$Re = \frac{2Vp}{au}(r_o - r_i) \tag{1}$$

where "V" is volume flow rate, "a" is area of annulus, "u" is viscosity of gas, "p" is density of gas, and "$r_o$" and "$r_i$" are radius of outer and inner tube, respectively. Because of the temperature dependence of gas viscosity and density, Reynold's numbers were calculated for those conditions within a plausible temperature range which may exist in the vicinity of the fireball of the discharge. Similar calculations were also undertaken for a range of coolant gas flow rates. The results of these Reynold's numbers calculations are shown in FIG. 4. Since those values are well within the criterion for laminar flow (i.e., below the reference number 2300), the flow pattern at this region is well within the laminar flow region.

With respect to the flow pattern inside the insert itself, Reynold's numbers can be calculated by the more general formula (see H. Hausen, *Heat Transfer in Counterflow, Parallel Flow and Cross Flow,* McGraw-Hill Book Company, p. 19 (1983):

$$Re = sd/v \tag{2}$$

where "s" is the velocity of the coolant gas flow, "d" is the diameter of the tube or channel, and an intrinsic viscosity, "v" of the coolant gas is described by the viscosity divided by the density of the gas. Since the gas velocity can be estimated by $$s = \frac{V}{nA} \tag{3}$$

where n = number of channels and A = l·w is the area of each channel ("l" and "w" are the length and width of each channel respectively). Assuming that the equivalent diameter for each channel is "d,"

$$\frac{\pi d^2}{4} = 1\theta w$$

Thus, $$d = 2\left(\frac{1\theta w}{\pi}\right)^{\frac{1}{2}} \quad (4)$$

Substitute (3) and (4) into (2), $$Re = \frac{2Vp}{nu\,(1w\pi)^{\frac{1}{2}}} \quad (5)$$

Figure 5:
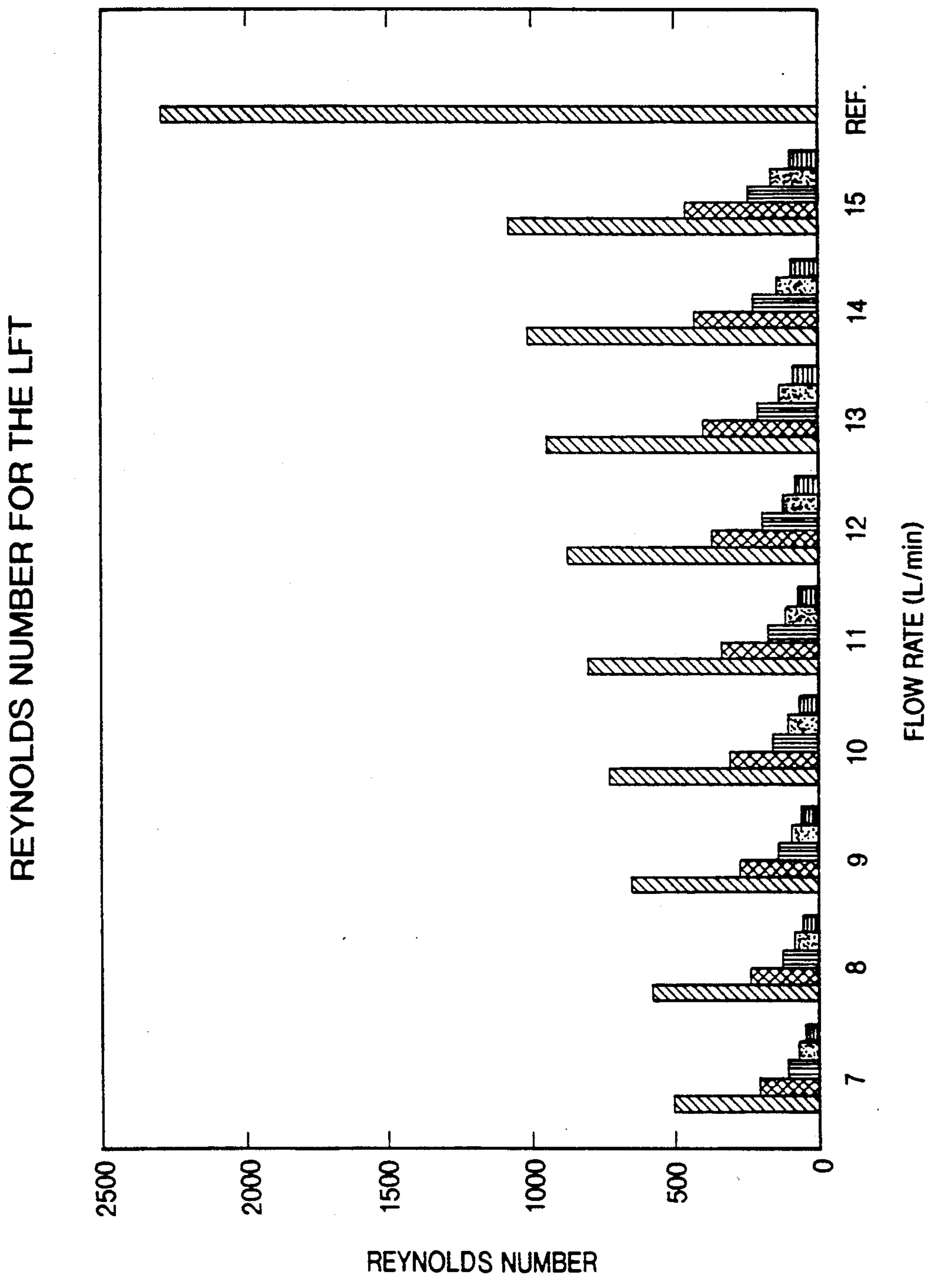
FIG. 5 is a graph of the Reynold's number for the LFT insert channels.

The results of calculations using equation 5 under the conditions in FIG. 4 are shown in FIG. 5. Even lower Reynold's numbers, about 77% of that for annulus cooling region, were calculated for the gas flow conditions less than 10 mm from the plasma discharge, thus indicating that the flow pattern within the region defined by the dimensions of the insert to be an even more well-defined laminar flow. Since the cooling region of the torch is right on top of the insert, the actual Reynold's number at this region for the LFT designed in this laboratory may be more accurately characterized by the Reynold's number of the channels instead of the annulus. In either calculation, the Reynold's numbers indicate that the design of LFT in this laboratory provides a more well-defined laminar flow pattern at the cooling region of the torch than other designs described elsewhere for which a Reynold's number of 650 at 13 L/min flow rate was reported (see Davies and Snook, loc. cit.).

Experimental Procedure

Figure 6:
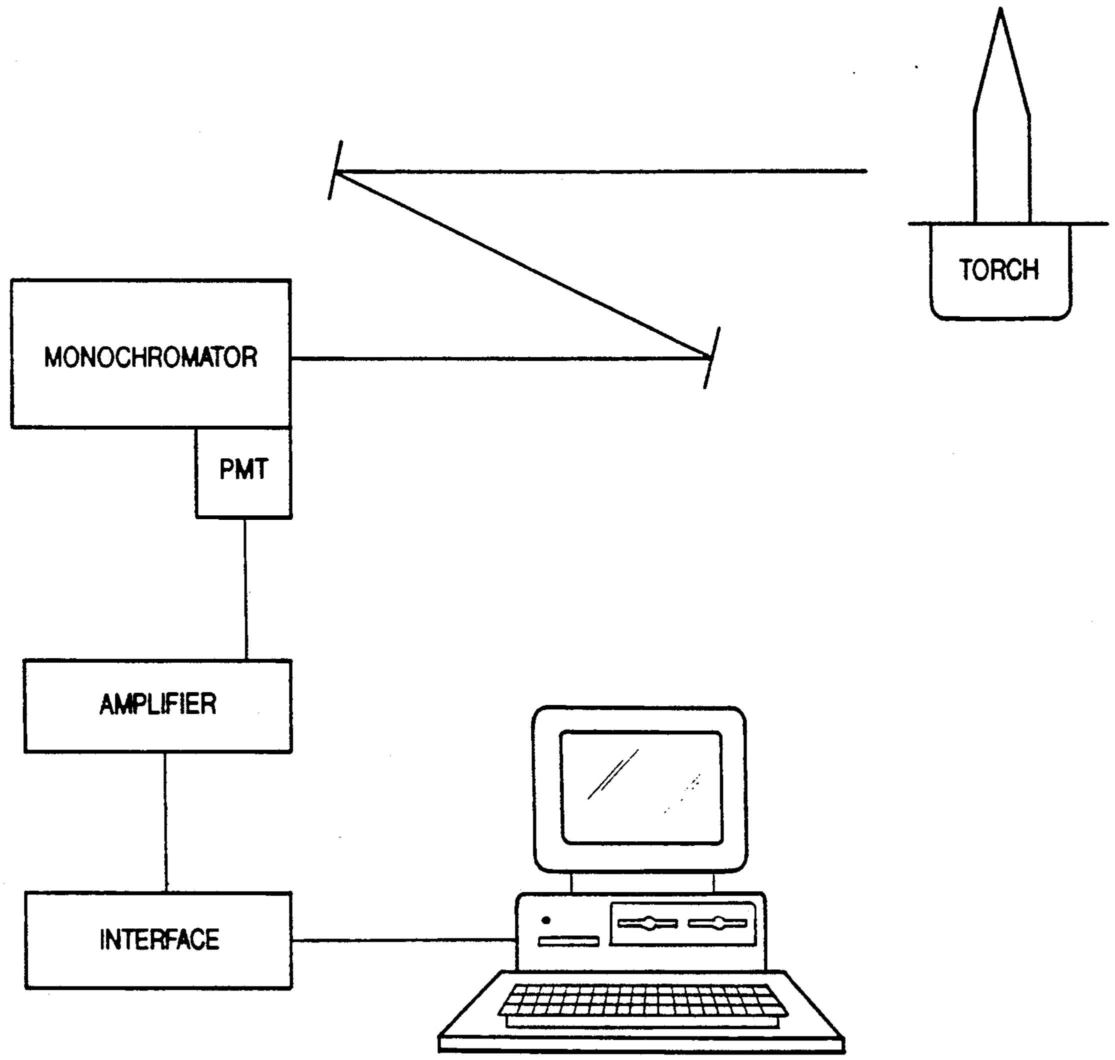
FIG. 6 is a block diagram of the experiment configuration.

A block diagram of the experimental configuration used in these studies is shown in FIG. 6. A 27.12 MHz quartz-controlled radio frequency generator and impedance matching network (PlasmaTherm, Inc., Kresson, N.J.) was used with a three turn load coil to sustain the discharge. Wavelength isolation was achieved by a 0.85 mm focal length cross-dispersion, Echelle monochromator typically used with a Spectrospan V plasma emission spectrometer (Applied Research Laboratories, Valencia, Calif.). All operating parameters are listed in Table I. The plasma, torch box, and impedance matching network were located on a three-dimensional translation stage constructed in our laboratory to enable adjustment of the plasma with respect to the entrance slits of the monochromator to allow maximum sensitivity to be attained. Image transfer was accomplished by two precision spherical 114 cm focal length mirrors with diameters of 11 cm placed in an over-and-under symmetrical arm pair with off-axis illumination for coma correction as described elsewhere (see "Off-Axis Imaging for Improved Resolution and Spectral Intensities", S. G. Salmon, et al., *Anal. Chem.*, Vol. 50, p. 1714 (1978); "Short-Time Electrode Processes and Spectra in a High-Voltage Spark Discharge", J. P. Walters, *Anal. Chem.*, Vol. 40, p. 1540 (1968); and "A Spectrometer for Time-Gated, Spatially-Resolved Study of Repetitive Electrical Discharges", R. J. Klueppel, et al., *Spectrochim. Acta*, Part B, Vol. 33, p. 1 (1978)). The resulting sagittal image was placed at the entrance slit at the monochromator to enable correction of astigmatic aberrations at the focal plane of the monochromator. The output signal from the photo multiplier tube (PMT) was amplified by a current amplifier (Model 427, Keighley, Cleveland, Ohio). The analog signal was further processed and digitized using a data acquisition system (Models SR245 and SR235, Stanford Research System, Palo Alto, Calif.) at a rate of 300 points/sec$^{-1}$. The resulting signal was further processed and analyzed by a dedicated microcomputer system (Model 158, Zenith data systems, St. Joseph, Mich.).

Stock solutions of 1000 mg $L^{-1}$ calcium and magnesium were prepared by dissolution of the reagent grade nitrate salts in doubly distilled, de-ionized water. All sample solutions were prepared daily by serial dilution with doubly distilled, de-ionized water. A stock solution of 10,000 mg $L^{-1}$ Na was prepared using reagent grade NaCl for all easily ionizable element (EIE) studies. The phosphate solution was prepared by dissolution of $NH_4H_2PO_4$ for a stock solution concentration of 10,000 mg $L^{-1}$.

Samples were introduced to the ICP using a concentric glass nebulizer (PlasmaTherm, Kresson, N.J.) with a Scott-type, double-pass spray chamber. All solutions were delivered to the nebulizer using a peristaltic pump with a flow rate of 1.33 ml min$^{-1}$.

The conditions of applied radio frequency power and argon gas flows are listed in Table II for each of the torch configurations investigated used except where specified. As indicated, the laminar flow torch was operated at 750 W of incident rf power with a coolant argon flow rate of 10 L min$^{-1}$. This was significantly different from the rf power and coolant flow conditions at which the conventional turbulent flow torch was operated (i.e., 750 W and 1000 W with 15 L min$^{-1}$. Attempts at operation of the conventional torch at the power and flow levels of the laminar flow torch resulted in either the extinguishing of the plasma or the melting of the outer quartz tubing. All measured intensities were corrected for variations in amplifier gain settings.

RESULTS AND DISCUSSION

Dynamic Range

Figure 7:
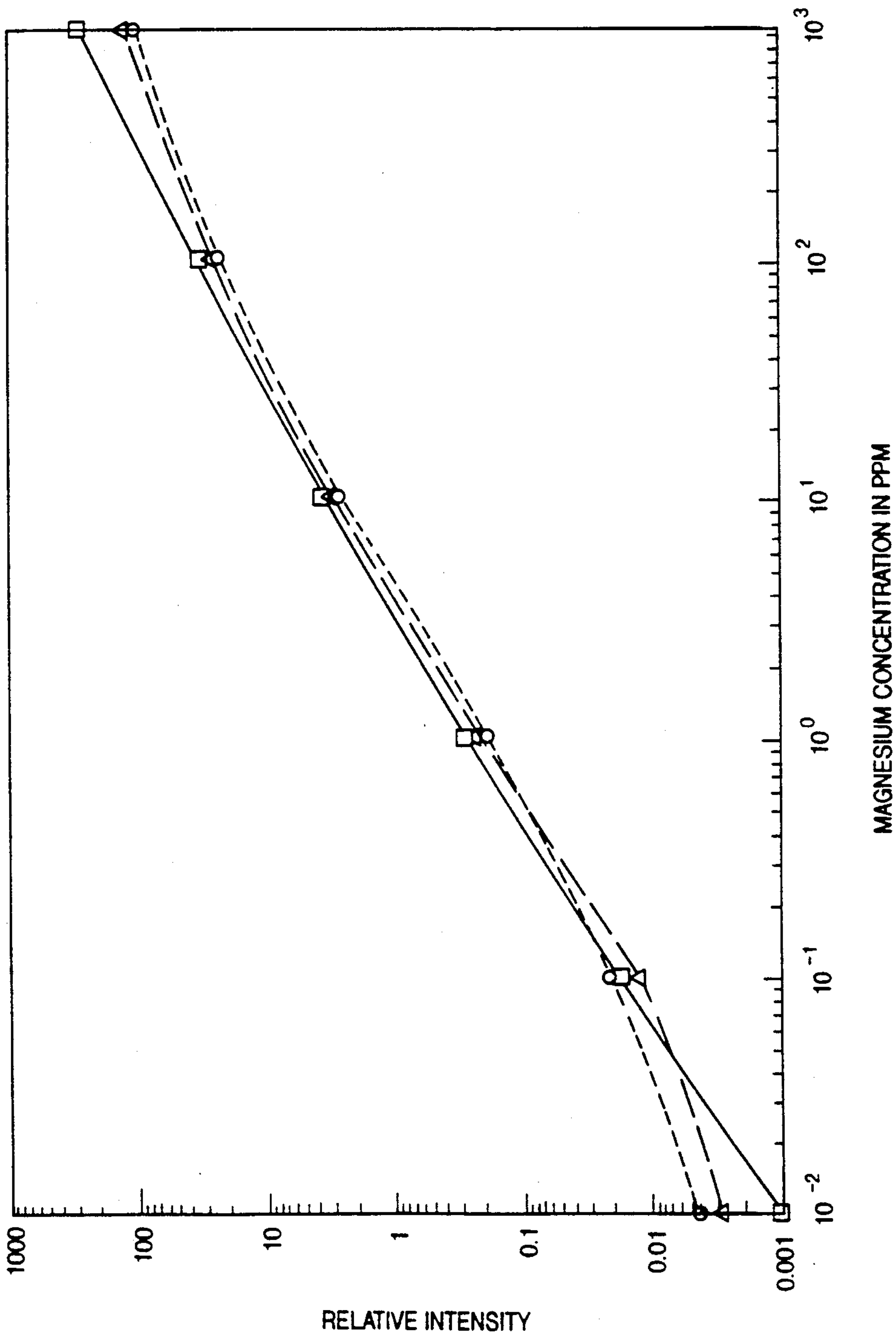
FIG. 7 is a graph of the linear dynamic range for magnesium atom emission at 285.2 nm.
Figure 8:
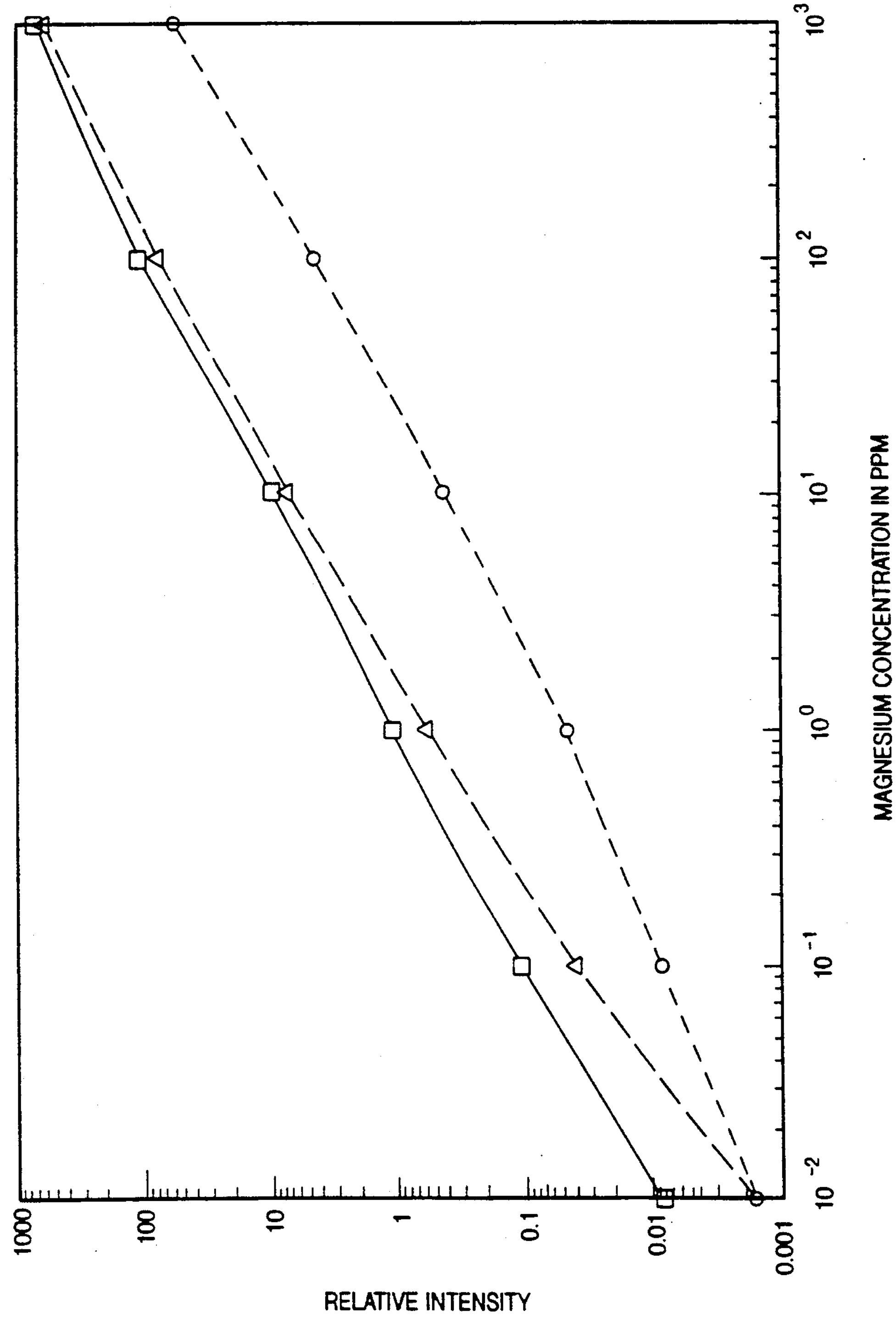
FIG. 8 is a graph of the linear dynamic range for magnesium ion emission at 279.6 nm.
Figure 9:
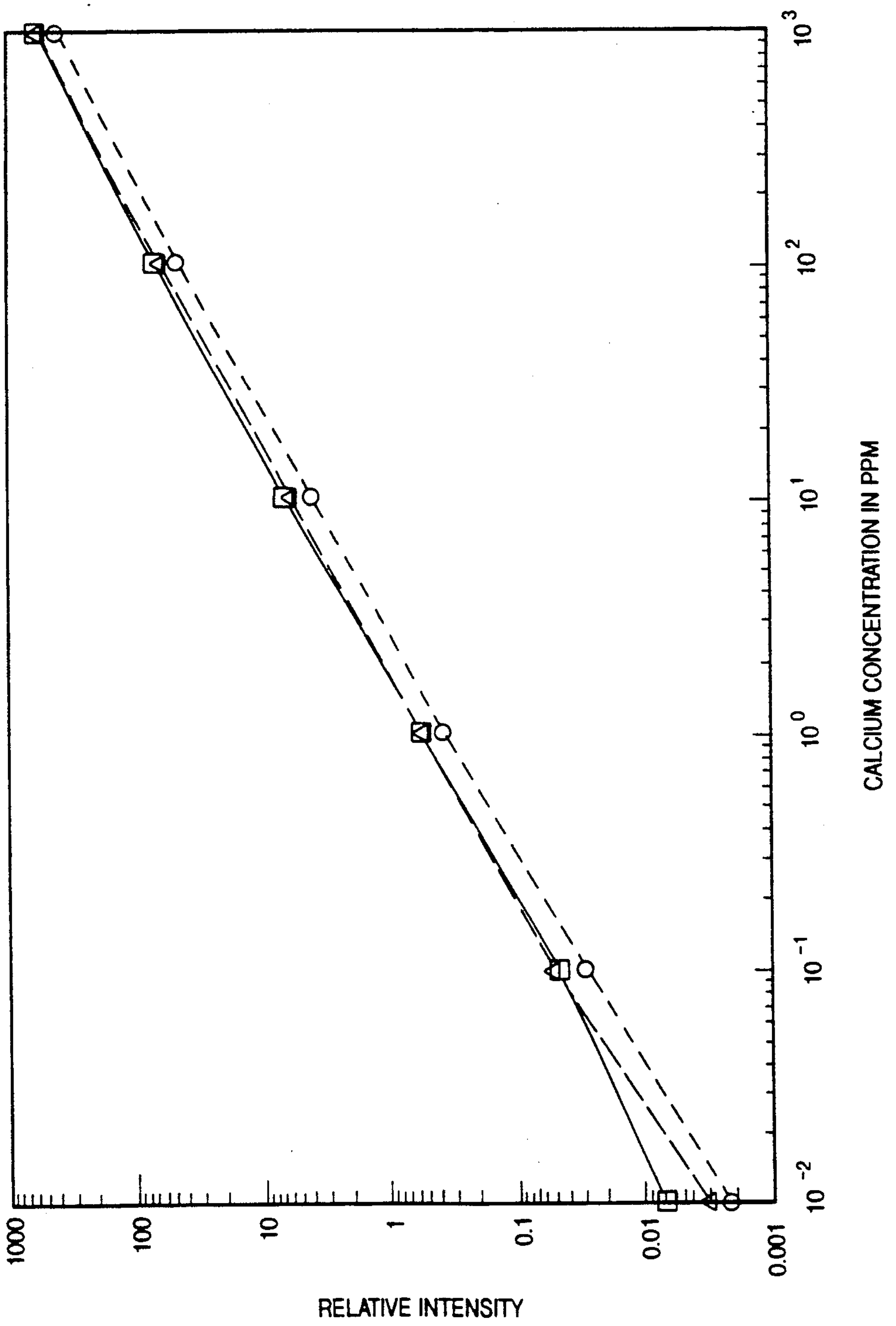
FIG. 9 is a graph of the linear dynamic range for calcium atom emission at 422.7 nm.
Figure 10:
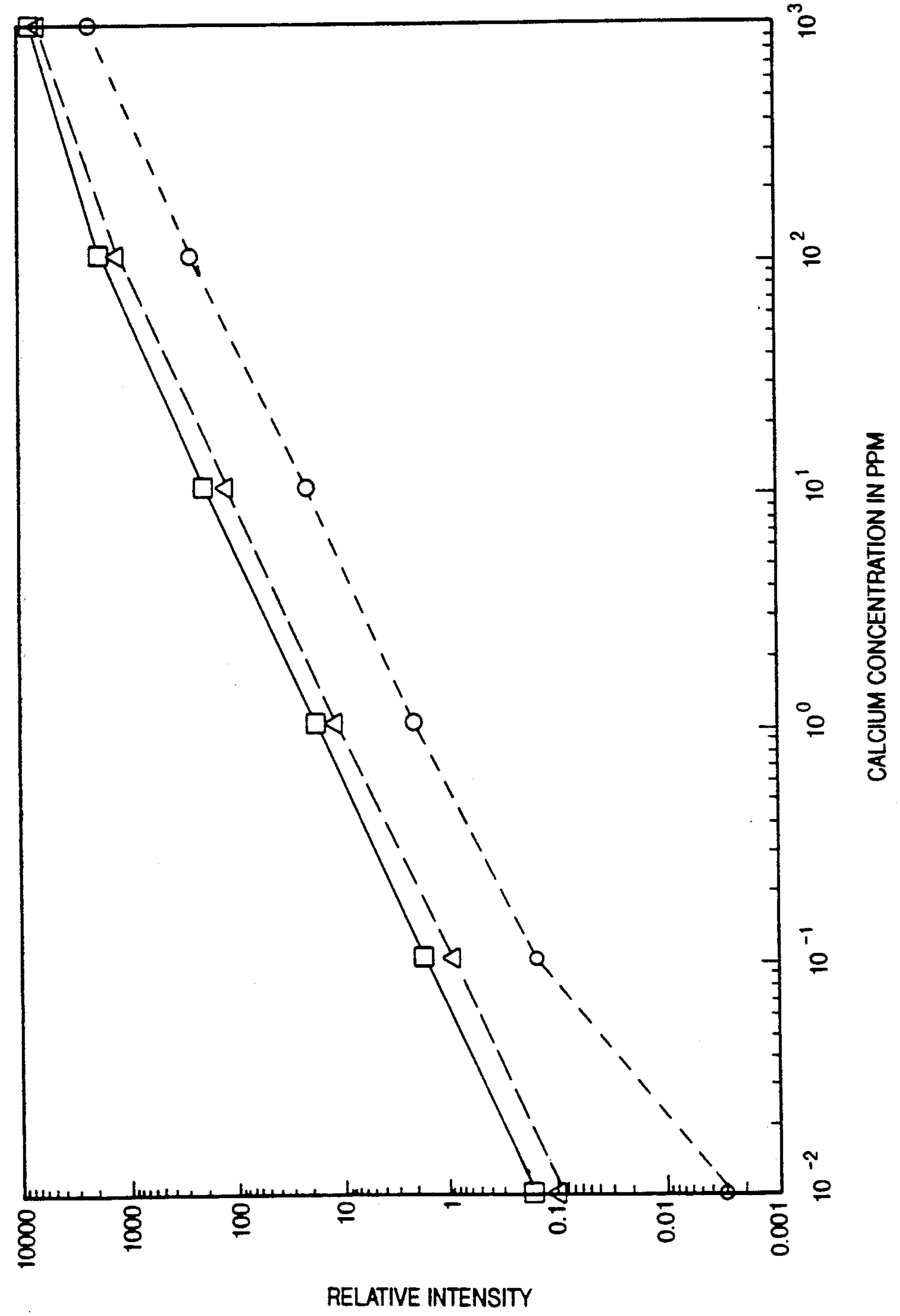
FIG. 10 is a graph of the linear dynamic range for calcium ion emission at 393.4 nm.

FIGS. 7 and 8 show plots of the relative intensity for magnesium atom (285.2 nm) and ion (279.6 nm) emission, respectively, as a function of concentration. Similar plots for calcium atom (422.7 nm) and calcium ion (393.4 nm) emission are depicted in FIGS. 9 and 10, respectively. For all four figures, the LFT, operated at 750 W, is observed to display larger relative intensities than for the TFT operated with an applied forward rf power of either 750 W or 1000 W. Specifically, the LFT was observed to demonstrate an increase in relative intensity for calcium ion (393.4 nm) by as much as one order of magnitude in comparison of that of TFT operated at the same applied rf power (FIG. 10).

In these studies, emission from the LFT was observed to display a linear dynamic range comparable to that observed using the TFT operated within the same optical configuration.

Relative intensity measurements shown in FIGS. 7-10 also indicate that the LFT has at least a $4\frac{1}{2}$ order magnitude of linear dynamic range which is no worse than TFT tested in the same experiment. It should be noted that the poorer linear dynamic range is in part a result of the less efficient light gathering capabilities of this optical system which was designed for high spatial fidelity rather than for high optical throughput. These studies are not intended to demonstrate the absolute capabilities of the analytical performance of this torch design, but rather to illustrate its performance compared to that of a conventional torch design.

Careful comparison indicates that the use of the LFT provides higher enhancement for ion emission than enhancement for atom emission. This might be a result of the presence of visibly more diffuse discharge with the use of the LFT compared to the fireball sustained in a TFT operated at the same level of applied rf power.

Signal-to-Noise-Ratios

Figure 11:
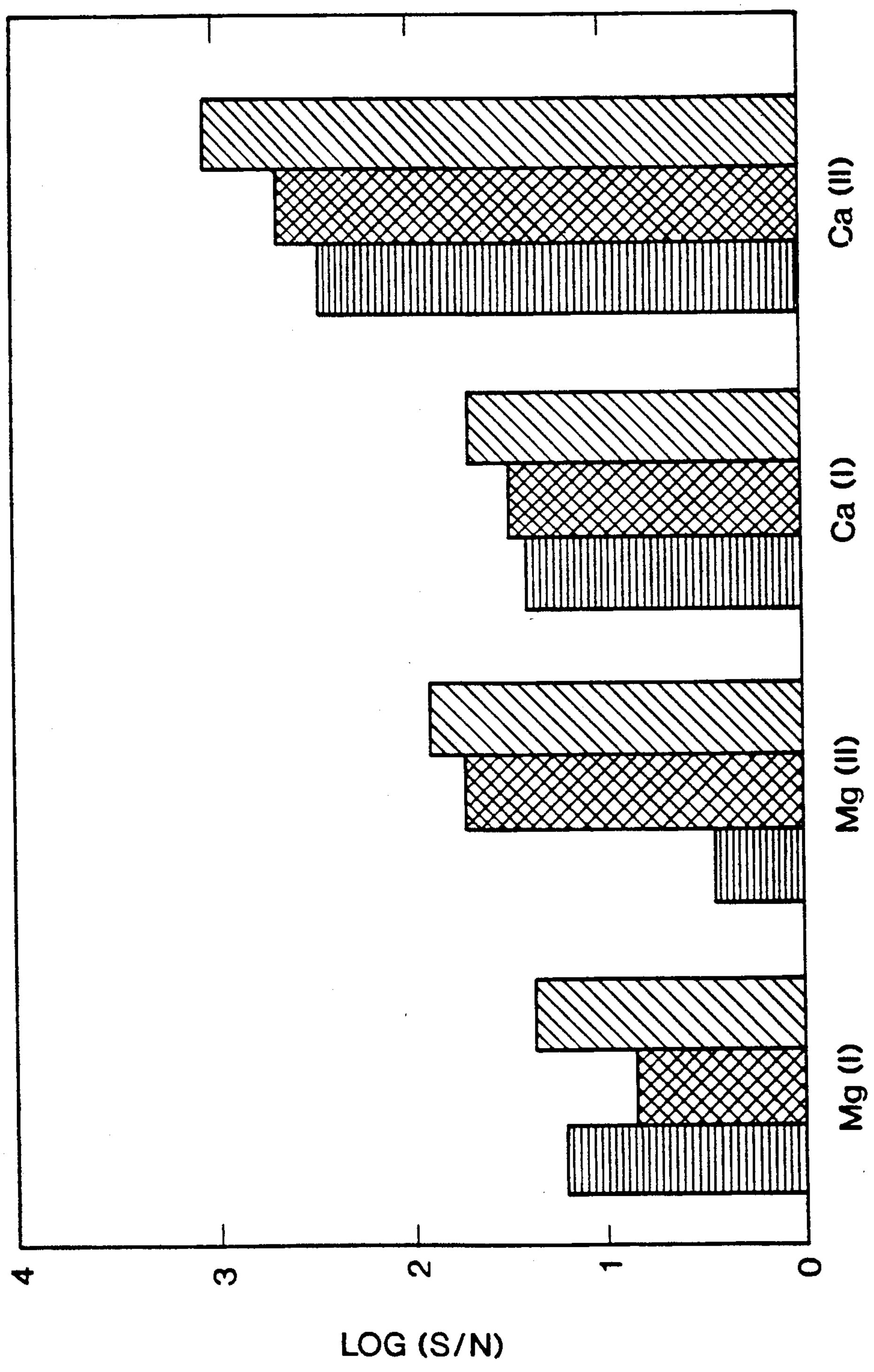
FIG. 11 is a graph of the signal to noise ratio for 10 ppm calcium or 10 ppm magnesium.

FIG. 11 shows the measured values of the signal to noise ratios for magnesium atom (285.2 nm), magnesium ion (279.6 nm), calcium atom (422.7 nm), and calcium ion (393.4 nm) with samples containing 10 mg $L^{-1}$ for each of the operating conditions tested. These signal-to-noise ratio variations were observed to be consistent throughout the analyte concentration range investigated for all four emitting species. Operation of the TFT at 1000 W power yielded a larger ratio than when it was operated at 750 W. However, operation of the LFT at 750 W yielded signal-to-noise ratios which were consistently larger.

Again, it should be emphasized that the operating gas flow parameters were considerably different between the TFT and the LFT. Thus, the observed improvement in the analytical performance of the ICP torch with the added laminar flow insert is even more significant.

Further investigation is needed to confirm whether (1) LFT provides relatively higher emission intensities, and/or (2) the noise level resulting from the rotation of plasma discharge has been reduced in LFT because in our designation laminar flow, instead of tangential flow, coolant is employed, and hence improves the signal-to-noise ratio.

Figure 12:
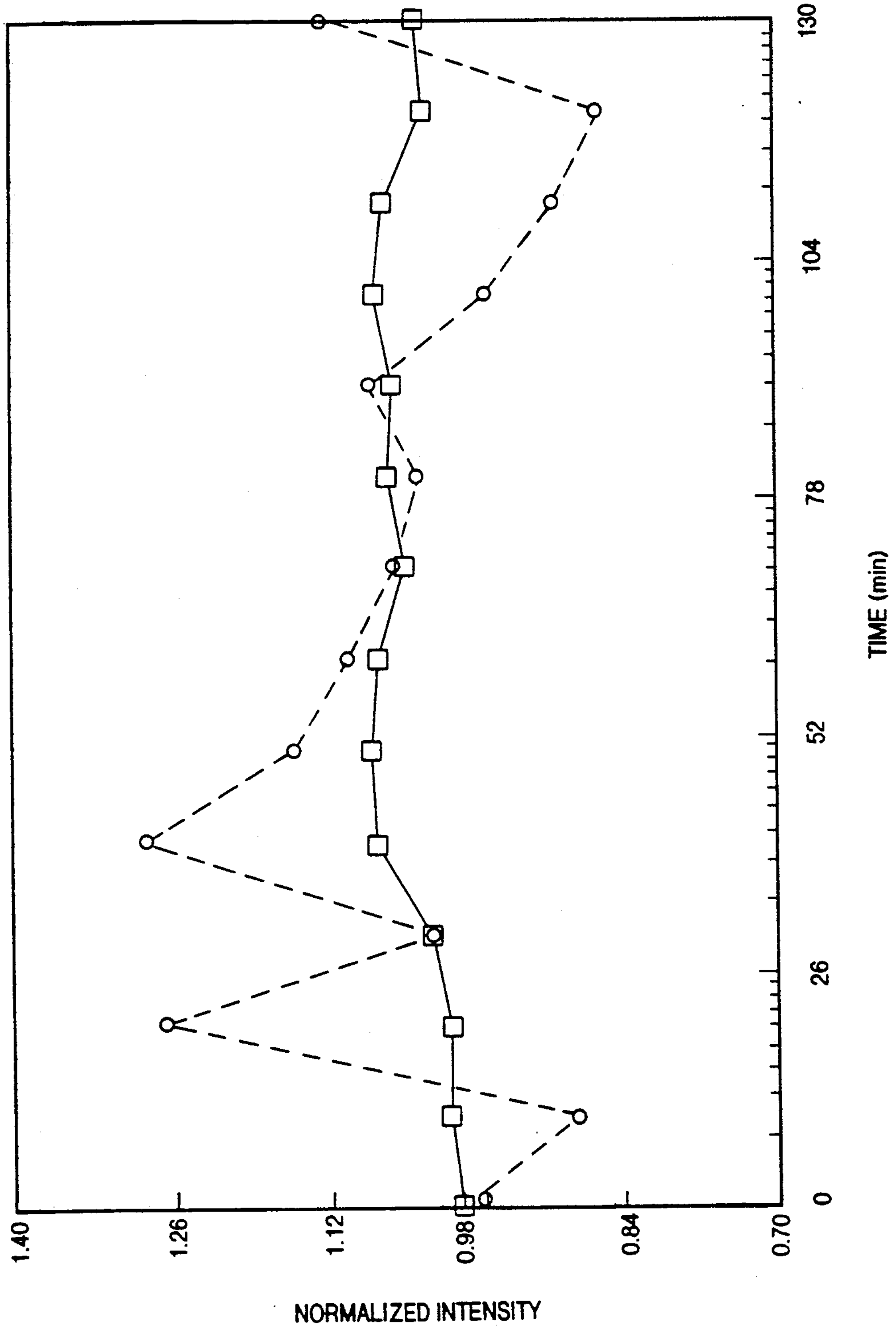
FIG. 12 is a graph of the stability of detection response for 10 ppm calcium.

A comparison of the short-term and long-term stability of the analytical emission signal using a laminar flow converted torch with the signal from a discharge stabilized in a conventional torch is shown in FIG. 12. The incorporation of the laminar flow insert clearly results in an improvement in the stability of the analytical emission signal (Ca ion emission was used in FIG. 12). Such improvements in short-term and long-term signal stability are directly related to the ability of the system to attain better precision in analytical determinations.

Vaporization Interference

Figure 13:
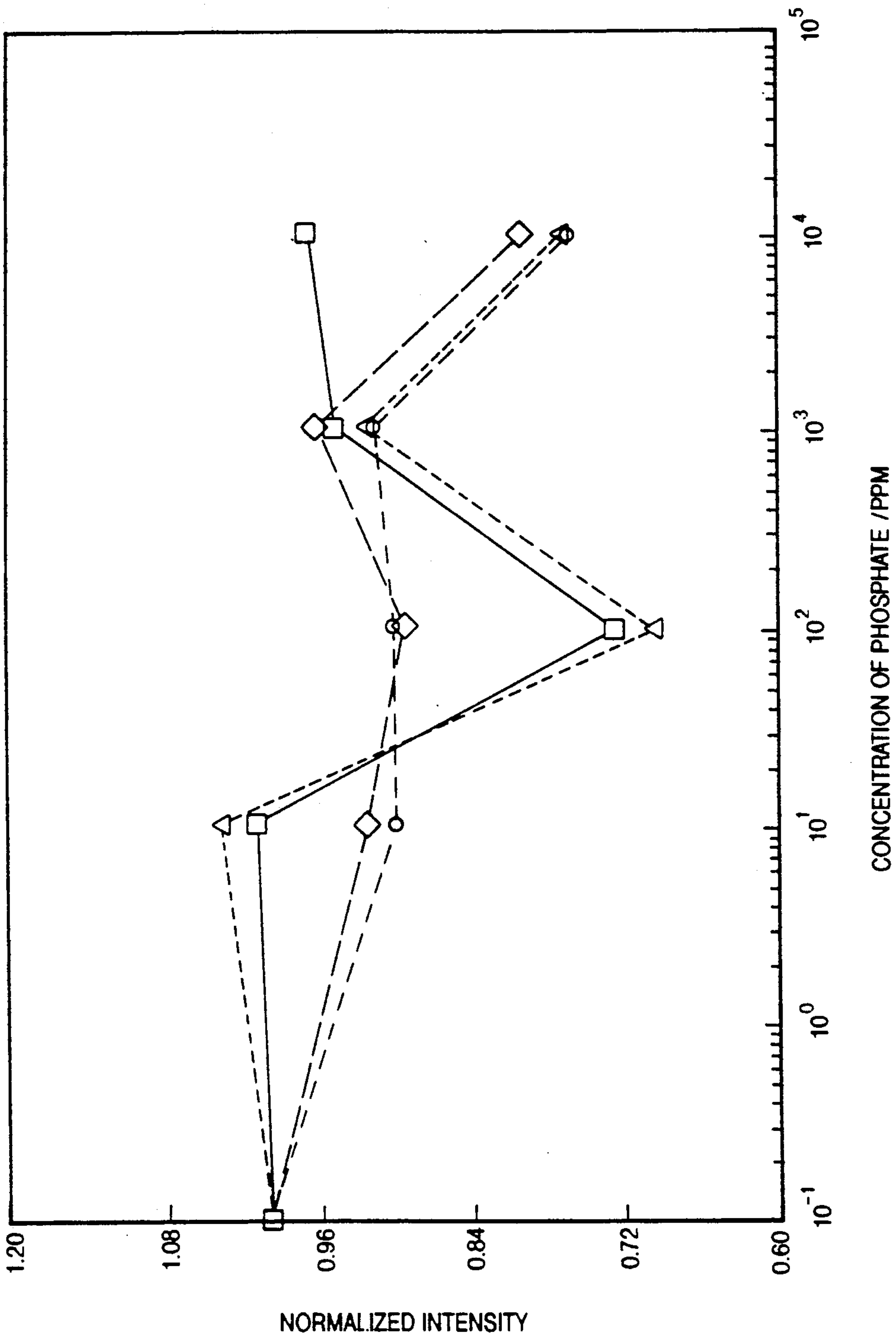
FIG. 13 is a graph of the interference of phosphate on calcium.

In order to more fully characterize the analytical performance of this coolant gas laminar flow torch design, the susceptibility of the resulting plasma to sample-dependent interferences was investigated. Because of the more diffuse character of the discharge sustained in the laminar flow torch, it was postulated more severe interferences might be observed resulting from the formation of more difficult-to-vaporize species. In an effort to test this concern, Ca atom and ion emission was measured as a function of added phosphate (present as $NH_4H_2PO_4$) using the conventional torch and the laminar flow torch configurations. The results of this study are shown in FIG. 13. All intensities were normalized to the signal measured with no added phosphate. Although no improvement in the magnitude of the observed interference was observed, no degradation in the analytical performance of the ICP torch was indicated.

Easily-Ionizable-Element Interference

Figure 14:
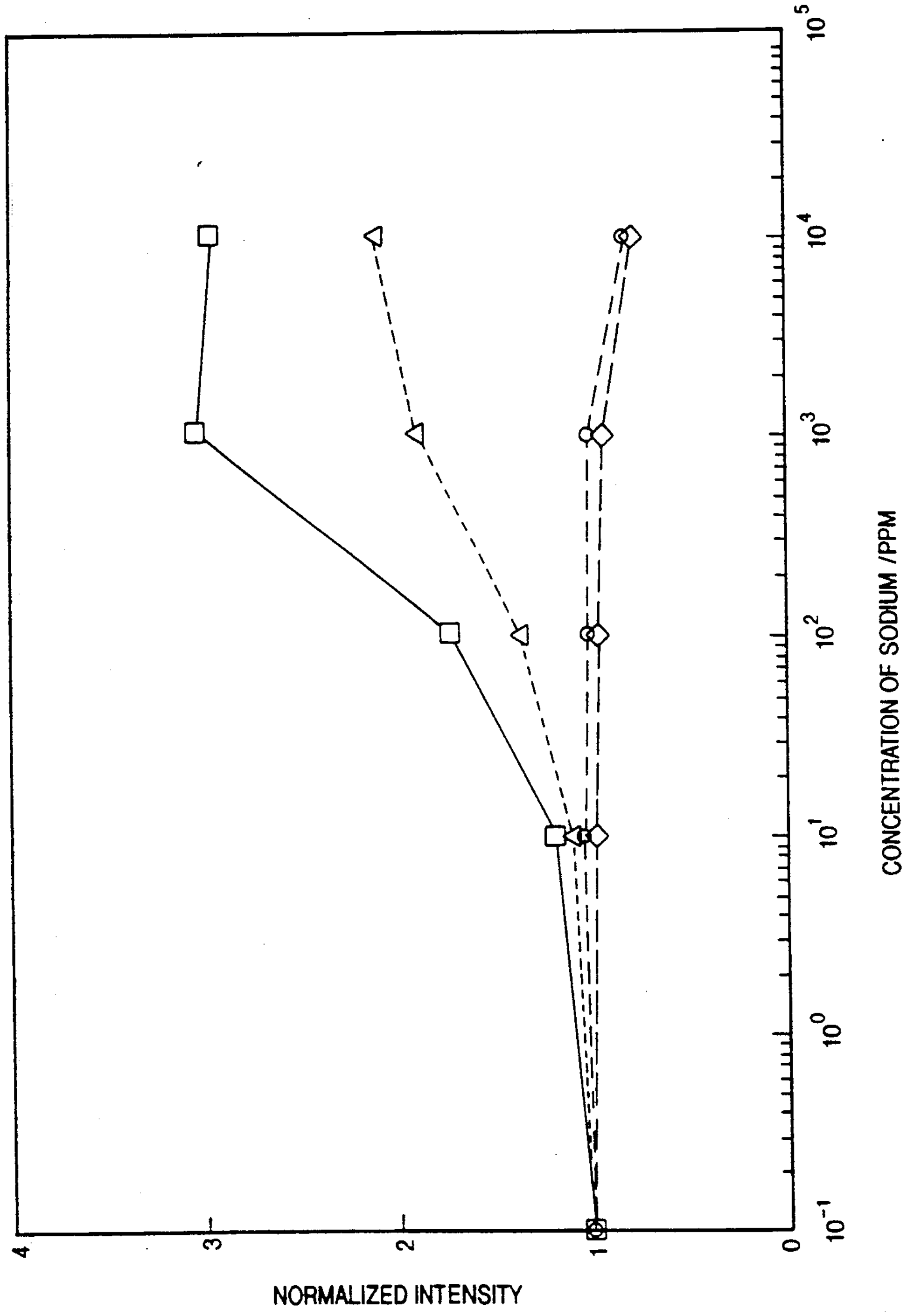
FIG. 14 is a graph of the interference of sodium on calcium.

Increasing amounts of Na were added to a solution of 10 mg $L^{-1}$ Ca and the atomic and ionic emission signals from both the LFT and the TFT were recorded. The resulting normalized signal intensities as a function of added Na are shown in FIG. 14. The Ca ion emission intensities were similarly affected using either torch configuration. However, a significant improvement in the magnitude of the enhancement of the relative atomic emission signal enhancement was observed with the use of the laminar flow torch. It should be noted that because of the different power and flow conditions which were required for the operation of either torch, viewing position was found to be critical and the use of the top of the load coil could not be used as a reference point to define the location of the observed emission within the discharge. All comparative measurements were undertaken employing the yttrium initial radiation zone internal reference point as was first suggested by S. R. Koirtyohann, et al., in "Nomenclature System for the Low-Power Argon Inductively Coupled Plasma", (*Anal. Chem.*, Vol. 52, p. 1965 (1980)).

CONCLUSIONS

The above discussions describe a design for the conversion of a conventional turbulent flow torch to a more laminar flow configuration. Both higher intensity and better signal-to-noise ratio at lower coolant flow have been achieved. It also has been shown that laminar flow coolant is a good arrangement for cooling and supporting of plasma discharge and LFT has an excellent potential to be used as a low-power, low-flow, and low-noise high sensitivity torch for inductively coupled plasma spectrometry.

TABLE I

| Element Interferences | Operating Parameters Mg (I) | Mg (II) | Ca (I) | Ca (II) | of Na and $PO_4$ |
|---|---|---|---|---|---|
| Wavelength (nm) | 285.2 | 279.6 | 422.7 | 393.4 | 393.4 |
| Entrance Slit (μm) (Horizontal × Vertical) | 50 × 200 | 50 × 200 | 25 × 100 | 25 × 100 | 50 × 200 |
| Exit Slit (μm) (Horizontal × Vertical) | 25 × 100 | 25 × 100 | 25 × 100 | 25 × 100 | 25 × 100 |
| Viewing Position Relative to Initial Radiation Zone (IRZ) top | −0.5 mm | +4.0 mm | −0.5 mm | +4.0 mm | +5.0 mm |

TABLE II

| Conditions of applied RF Power and Argon Gas Flow | | | |
|---|---|---|---|
| Torch Type | LFT | TFT (1) | TFT (2) |
| Applied RF Power (W) | 750 | 750 | 1000 |
| Cooling Gas (L/min) | 10 | 15 | 15 |

TABLE II-continued

| Conditions of applied RF Power and Argon Gas Flow | | | |
|---|---|---|---|
| Plasma Gas (L/min) | 2 | 0 | 0 |

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. An inductively coupled gas plasma torch comprising:

an outer tubular sleeve and an inner tubular sleeve, said inner tubular sleeve being positioned concentrically within and spaced inwardly from said outer tubular sleeve, said outer and inner sleeves being adapted to receive a coolant gas flowing between said sleeves and a plasma gas flowing within said inner sleeve, said outer sleeve and said inner sleeve each including a discharge end, said discharge end of said inner sleeve being spaced longitudinally inwardly from said discharge end of said outer sleeve whereby there is provided a heating zone between said discharge ends of said outer and inner sleeves, said inner sleeve being stepped up in diameter along a portion of its length extending from said discharge end of said inner sleeve, and a tubular insert having inner and outer surfaces and having a discharge end and an inlet end, said tubular insert being positioned concentrically and snugly fitted between said outer tubular sleeve and said portion of said inner tubular sleeve having a stepped up diameter, said insert further including multiple longitudinal linear gas flow channels opening outwardly from said outer surface of said insert;

whereby coolant gas introduced into said torch between said inner and outer tubular sleeves is constrained to flow through said gas flow channels of said tubular insert and emerges therefrom in a laminar flow that extends along said inner surface of said outer sleeve through said heating zone.

2. The inductively coupled gas plasma torch defined in claim 1 wherein said plasma gas is inductively heated by means of an induction coil encircling said outer sleeve in the vicinity of said heating zone.

3. The inductively coupled gas plasma torch defined in claim 1 wherein said discharge end of said insert is spaced longitudinally inwardly from said discharge end of said inner sleeve, whereby radiative cooling heating of said insert by plasma formed in said heating zone is minimized.

4. The inductively coupled gas plasma torch defined in claim 1 wherein said gas flow channels are rectangular in cross section.

5. The inductively coupled gas plasma torch defined in claim 4 wherein said gas flow channels are equidimensional and have a width no greater than their depth.

6. The inductively coupled gas plasma torch defined in claim 5 wherein said gas flow channels are approximately 0.2 millimeters in depth.

7. The inductively coupled gas plasma torch defined in claim 6 wherein said tubular insert includes approximately 30 equally spaced longitudinal gas flow channels.

8. The inductively coupled gas plasma torch defined in claim 1 wherein said insert is formed of a high temperature machinable polymer.

9. The inductively coupled gas plasma torch defined in claim 1 wherein said tubular insert is a refractory material.

10. The inductively coupled gas plasma torch defined in claim 9 wherein said refractory material is boron nitride.

11. The inductively coupled gas plasma torch defined in claim 1 wherein the length of said over which said inner sleeve is stepped up in diameter is less than the length of said tubular insert.

12. The inductively coupled gas plasma torch defined in claim 1 wherein said tubular insert has a length greater than its diameter.

13. The inductively coupled gas plasma torch defined in claim 1 wherein said inner and outer sleeve are made of a quartz material.

14. The inductively coupled gas plasma torch defined in claim 1 further comprising a sample injection tube positioned within said inner sleeve, whereby a sample may be introduced into a gas stream flowing through said inner sleeve.

15. The inductively coupled gas plasma torch defined in claim 14 wherein said sample injection tube is positioned concentrically within said inner sleeve and has a substantially smaller diameter than said inner sleeve.

16. The inductively coupled gas plasma torch defined in claim 15 wherein said sample injection tube includes a discharge end spaced longitudinally inwardly from said discharge end of said inner sleeve.

* * * * *